United States Patent [19]

Harter, et al.

[11] Patent Number: 4,633,475
[45] Date of Patent: Dec. 30, 1986

[54] OPTICAL LIMITER

[75] Inventors: Donald J. Harter, Piscataway; Michael L. Shand, Morristown; Yehuda B. Band; Harold Samelson, both of Elizabeth, all of N.J.

[73] Assignee: Allied Corporation, Morris, N.J.

[21] Appl. No.: 502,908

[22] Filed: Jun. 10, 1983

[51] Int. Cl.$^4$ .............................................. H01S 3/10
[52] U.S. Cl. ...................... 372/25; 372/11; 372/41
[58] Field of Search .................. 372/25, 40, 41, 9, 68, 372/89, 39, 11, 57, 29

[56] References Cited

U.S. PATENT DOCUMENTS

| 3,997,853 | 12/1976 | Morris et al. | 372/41 |
| 4,272,733 | 6/1981 | Walling et al. | 372/20 |
| 4,403,323 | 9/1983 | Nicolai | 372/68 |
| 4,479,223 | 10/1984 | Fletcher et al. | 372/53 |

OTHER PUBLICATIONS

R. H. Pantell et al., Appl. Phys. Lett. 11, 213, (1967) "Laser Power Stabilization By Means of Nonlinear Absorption".
S. A. Krysanov et al., Chem. Phys. Lett. 91, 77, (1982) "Ultrafast Formation of Transients In Spiropyran Photochromism".
J. Schwartz et al., Appl. Phys. Lett. 11, 242, (1967), (see also, A. Hordvik, IEEE J. Quantum Electron. QE-6, 199, (1970) "Effects of Internal Induced Absorption On Laser Emission" and Pulse Stretching Utilizing Two--Photon-Induced Light Absorption.
M. L. Shand et al., J. Appl. Phys. 52, 953, (1981) "Excited-state Absorption In The Pump Region Of Alexandrite".

Primary Examiner—Leon Scott, Jr.
Attorney, Agent, or Firm—James Riesenfeld

[57] ABSTRACT

An optical device that stabilizes the power in a cw laser beam comprises a material whose absorption coefficient increases with increasing incident intensity. The same device acts as an energy limiter and pulse shortener for a pulsed laser. In either case, the device can be located either within the laser cavity or outside it. Materials suitable for use in the device include Cr-doped crystalline solids and organic solutions, such as laser dyes, saturable absorber dyes, etc.

14 Claims, 3 Drawing Figures

OPTICAL LIMITER

BACKGROUND OF THE INVENTION

1. Field of the Invention

This invention relates to an optical device for limiting transmitted power by means of induced absorption. Cr-doped crystalline solids and solutions of organic compounds suitable for such a device exhibit an absorption coefficient that increases with increasing intensity.

2. Background of the Invention

For some applications of lasers, it is desirable to have uniform output power over time. Both passive and active techniques for minimizing output fluctuations have been disclosed. A passive technique based on the Rayleigh effect in benzene was disclosed by R. H. Pantell et al., Appl. Phys. Lett. 11, 213 (1967).

Active techniques, which involve sampling the laser output and using the detected signal to control the voltage on a Pockels cell in the laser cavity, have been disclosed by F. R. Marshall et al., Proc. IRE 50, 2108 (1961); H. Statz et al., J. Appl. Phys. 36, 1510 (1966); and C. H. Thomas et al., IEEE J. Quantum Electron. QE-2, 617 (1966).

A summary of techniques for reducing amplitude fluctuations of laser output appears in W. Koechner, *Solid-State Laser Engineering* (Springer-Verlag, New York, 1976), pp. 91–97, 229–232.

Besides the above-described techniques, which have been described in the context of laser technology, a great deal of research has been directed to the development of materials that darken on being irradiated with electromagnetic radiation of various wavelengths. Generally, these "photochromic" materials involve chemical reactions that take place on a longer time scale than is necessary for reducing high-frequency laser amplitude fluctuations. Some photochromic materials respond very rapidly to actinic irradiation (see, e.g., S. A. Krysanov et al., Chem. Phys. Lett. 91, 77 (1982); however, irradiation at another wavelength is required to bleach the darkened material.

For some laser applications it is desirable to have very short pulses. To accomplish this, a "saturable absorber" may be inserted into a pulsed laser beam path. A saturable absorber absorbs the initial part of an incident pulse, but passes the later part, thereby providing a transmitted pulse that is shorter than the incident pulse. (See, e.g., P. G. Kryukov and V. S. Letokhov, IEEE J. Quantum Electron. QE-8, 766 (1972)).

SUMMARY OF THE INVENTION

For purposes of this specification and the appended claims, an optical limiter is an optical device that limits the radiation transmitted through it.

In accordance with the present invention, an optical limiter is provided that comprises a material that has a ground state, a first excited state, and a second excited state of higher energy than the first excited state, and has, over a range of incident wavelengths, (a) a cross section for excitation from the first excited state that is greater than the cross section for excitation from the ground state to the first excited state;

(b) substantially no decay from the first excited state to states that have decay times longer than the time for decay from the first excited state to the ground state, and (c) rapid decay from the second excited state to the first excited state.

A process for stabilizing the power in a laser beam comprises placing in the path of the laser beam a material that has a ground state, a first excited state, and a second excited state of higher energy than the first excited state, and has, at the wavelength of the laser beam, (a) a cross section for excitation from the first excited state that is greater than the cross section for excitation from the ground state to the first excited state;

(b) substantially no decay from the first excited state to states that have decay times longer than the time for decay from the first excited state to the ground state, and (c) rapid decay from the second excited state to the first excited state.

A process for limiting the energy in a laser pulse comprises placing in the path of the pulse, at a point where the incident energy during the pulse interval is at least about a predetermined energy, a material that has a ground state, a first excited state, and a second excited state of higher energy than the first excited state, and has, at the wavelength of the pulse, (a) a cross section for excitation from the first excited state that is greater than the cross section for excitation from the ground state to the first excited state;

(b) substantially no decay from the first excited state to states that have decay times longer than the time for decay from the first excited state to the ground state, and (c) rapid decay from the second excited state to the first excited state.

For brevity, "first" is generally omitted in references to the first excited state in this specification.

DETAILED DESCRIPTION OF THE INVENTION

Figure 1:
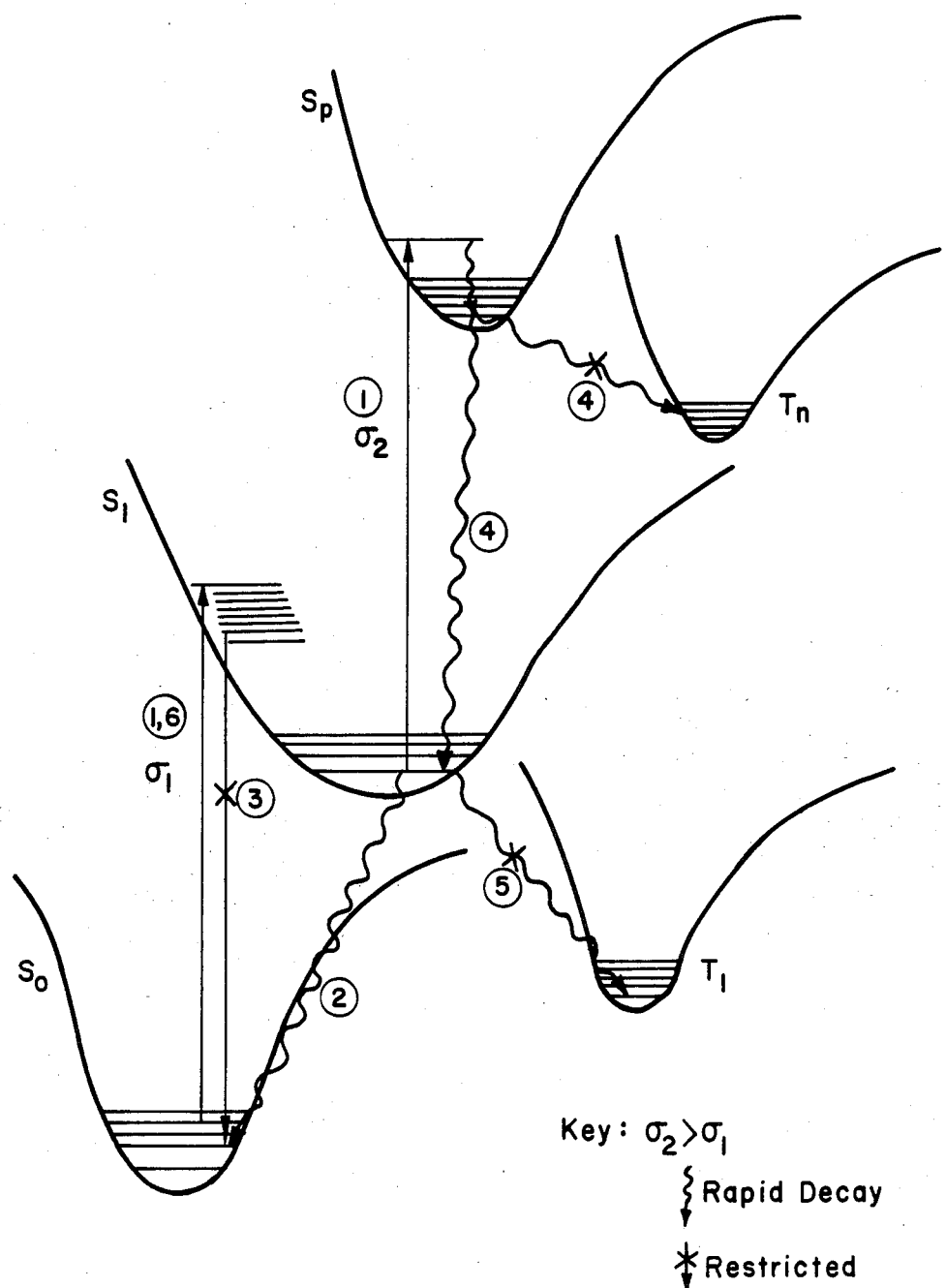
FIG. 1 is a schematic of potential curves for an optical limiter material.

For many applications, it is desirable to minimize temporal fluctuations in the output beam of a cw laser. These fluctuations can be reduced by placing in the path of the beam a material whose absorption coefficient increases with increasing intensity. The material acts as an output power limiter (OPL). Alternatively, a material that shows this "induced absorption" can act as an output energy limiter and pulse shortener (EL/PS), limiting the output energy and pulse duration of a pulsed- or Q-switched-laser. Various mechanisms can cause a material to show induced absorption. In the materials of the present invention, the mechanism involves excited state absorption greater than ground state absorption; however, that is but one of six criteria for preferred optical limiter materials:

1. In the optical limiters of the present invention, the excited state absorption cross section, $\sigma_2$, is greater than the ground state absorption cross section, $\sigma_1$, at the wavelength of interest.

2. An important consideration for a practical OPL is the response time; i.e., the induced absorption must appear (and disappear) rapidly enough to follow the laser intensity fluctuations. These fluctuations have several origins—relaxation oscillation, mode beating, and parasitic noise—and can extend in frequency from less than 1 kHz to the GHz range. It is the decay time to the ground state that limits the response time of the OPL. Thus, this decay time should be shorter than the time scale of the fluctuations. Ideally, for fast response, the decay time is on the order of a microsecond or shorter. However, in many cases the noise is predominantly at low frequencies (for example 60 and 120 Hz generated by ac power sources), and alexandrite, whose lifetime is 250 $\mu$s, is a preferred material for an optical limiter. Ruby, whose lifetime is 3 ms, and MgO:Cr$^{3+}$, whose lifetime is 8 ms, are other preferred materials.

3. It is desirable that the excited state not be appreciably depopulated to the ground state by stimulated emission, since this effect would compete with ground state absorption.

4. Another important criterion for an optical limiter material is that after excitation from the excited state to a second excited state the decay be primarily to the excited state and be "rapid." "Rapid," in this context, means on a time scale that is short compared with the time scale of either the fluctuations, for an OPL, or the pulse duration, for an EL/PS. In particular, for an OPL, decay from the second excited state must be more rapid then decay from the excited state, so that the second excited state doesn't saturate.

5. The excited state should not decay to states that have decay times longer than the time for decay from the excited state to the ground state, since that would effectively reduce the population available for induced absorption.

6. Finally, although excited state absorption must be greater than ground state absorption to provide an effective operating region for the limiter, ground state absorption must be great enough in the first instance to create the excited state population that shows the strong absorption.

Also important for an optical limiter material are its thermal properties. Since the limiter must absorb substantial amounts of energy when in use, it is important that the material have good thermal stability.

FIG. 1 is a schematic of potential curves, including a ground state, $S_o$, first excited state, $S_1$, and second excited state, $S_p$. Each transition is numbered to correspond to the criterion that relates to it. Note that the structure shown in FIG. 1 is only exemplary. Among the possible variations on the structure shown are a triplet first excited state ($T_1$), rather than an excited singlet state, and an unbound second excited state.

Figure 2:
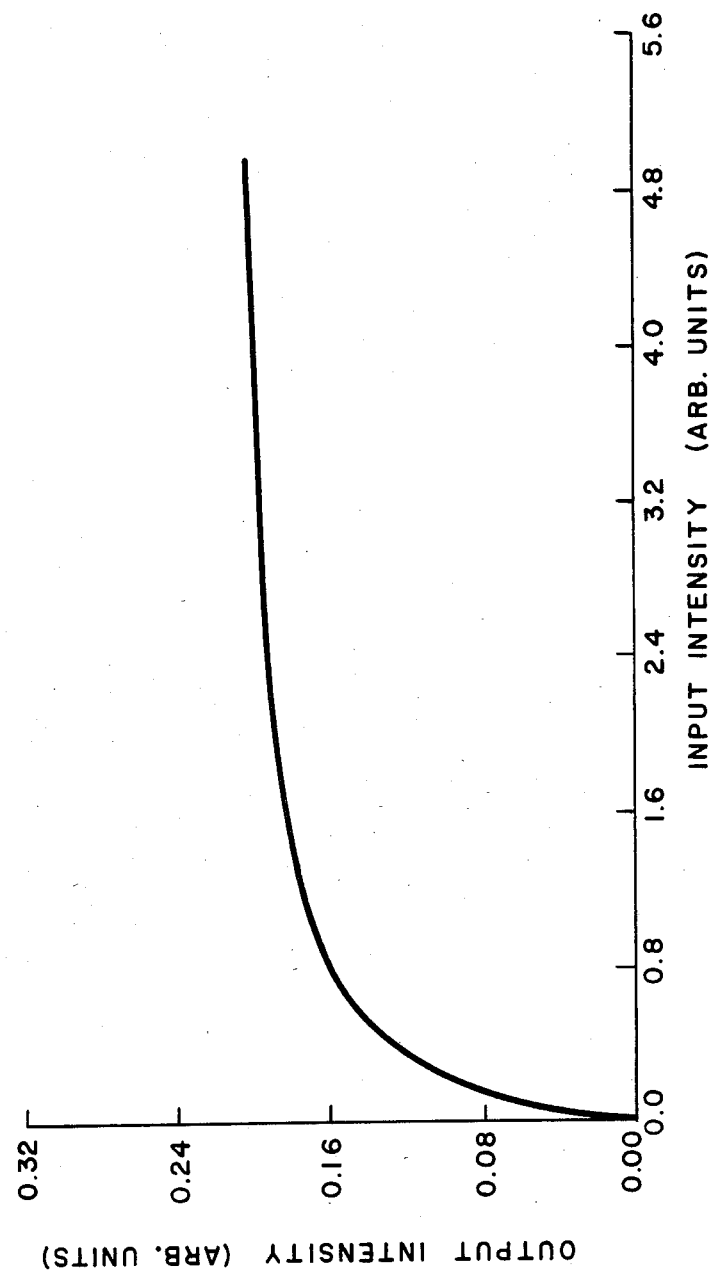
FIG. 2 depicts the output/input relationship for an ideal optical power limiter.

FIG. 2 shows output intensity versus input intensity for an ideal optical limiter. At low incident intensity, not many excited states are populated and the absorption is nearly linear. At very high incident intensity, excited state absorption dominates, and the output intensity is nearly constant. An OPL is most effective when the input intensity is of the order of the saturation intensity, $I_{sat}$, which is given by $$I_{sat} = \frac{hc \pi r^2}{\lambda \sigma_1 \tau_f},$$

where h is Planck's constant, c the speed of light, $\lambda$ the wavelength of the incident radiation, r the beam radius, $\sigma_1$ the ground state absorption cross section, and $\tau_f$ the lifetime of the first excited state. To increase the range of intensities over which the OPL is effective, the beam radius may be reduced (by focusing) to minimize $I_{sat}$. However, the depth of focus should not be shorter than the length of the OPL, so that the beam radius does not vary greatly over that length.

A variety of substances—solids, liquids, and gases—meet the six criteria that characterize preferred optical limiter materials. Among solids, crystalline solids that incorporate Cr-dopant ions, such as ruby, MgO:Cr$^{3+}$, and alexandrite, are preferred. Alexandrite is effective in the wavelength range 450-510 nm, where the excited state absorption exceeds the ground state absorption (M. L. Shand et al., J. Appl. Phys. 52, 953 (1981)). Thus, alexandrite is suitable for use with argon ion and excimer lasers that emit in that wavelength range.

Among liquids, solutions of certain aromatic hydrocarbons and organic dyes are suitable. Preferred liquids are laser dyes and saturable absorber dyes used in Q-switching and mode-locking. However, as discussed below, these dyes must be used in wavelength regions where $\sigma_2 > \sigma_1$. An advantage of these materials for optical limiters is that their decay time from the excited state to the ground state is typically of the order of a few nanoseconds. Thus, they are suitable (provided the other criteria are met) for use in limiting fluctuations having GHz frequencies, which are as high as is necessary for the purposes of this invention.

In general, laser dyes and saturable absorber dyes meet four of the six criteria set out earlier, one exception being criterion 1, $\sigma_2 > \sigma_1$. Saturable absorber dyes are selected to provide reduced absorption at high incident intensity; however, wavelength/intensity regions in which $\sigma_2 > \sigma_1$ can generally be found as well.

Criterion 5, above, is also not usually met, because decay takes place from the excited state to a long-lived triplet state. To the extent that this interferes with the performance of an optical limiter, it may be desirable to move the dye rapidly through the beam path or, alternatively, to add a quencher to the dye. It is well known in the laser art to add a quencher to laser dyes to reduce the triplet state lifetime (R. Pappalardo et al., Appl. Phys. Lett. 16, 267 (1970); IEEE J. Quantum Electron. QE-6, 716 (1970)). Thus, whenever reference is made to laser dyes and saturable absorber dyes in this specification and the appended claims, it is understood that these quenchers are included in the dyes, as necessary.

The procedure for identifying a suitable optical limiter liquid is as follows:

1. Identify a laser dye or saturable absorber that absorbs at $\lambda$, the wavelength of interest (i.e., the wavelength of the radiation to be limited), as well as at $\lambda/2$. Absorption spectra of many of these materials have been published (see, e.g., the references cited in "*Laser Dyes,*" brochure published by Exciton Chemical Co., Dayton, OH; "Kodak Laser Products," Dataservice Catalog JJ-169, published by Eastman Kodak Co., 1982; and *Dye Lasers: Topics in Applied Physics,* Vol. 1, F. P. Schäfer, ed., Springer, NY, 1977, pp. 180-193). Alternatively, the absorption spectra may be measured by techniques well known in the art. The ground state absorption at $\lambda$ must be adequate to create substantial excited state ($S_1$) population (criterion 6, discussed earlier). The absorption at $\lambda/2$ indicates that a second excited state ($S_p$) exists that can be populated by excited state absorption at about the wavelength $\lambda$.

2. Determine whether $\sigma_2 > \sigma_1$ at $\lambda$ for the intensity range of interest. If the data for the particular material have not been published, they can be determined by the method described by M. L. Shand et al., loc. cit. Alternatively, the material can simply be placed in the beam path and the transmission measured as a function of incident power. Typical wavelength ranges and materials for which $\sigma_2 > \sigma_1$ are tabulated below:

| Wavelength Range (nm) | Material |
|---|---|
| 360–370 | Anthracene (not a dye) |
| 400–460 | Rhodamine 6G |
| 430–590 | Cresyl violet perchlorate |
| 400–650 | 1,1 Diethyl-4,4' carbocyanine iodide |
| 720–760 | 1,3,3,1,3,3'-hexamethyl-indotricarbocyanine iodide (HITC) |

Specific combinations of lasers and eligible optical limiter materials are:

| Laser ($\lambda$) | Material |
|---|---|
| Nitrogen (337 nm) | Rhodamine B |
| | Rhodamine 6G |
| | Na—fluorescein |
| Doubled alexandrite (365 nm - tunable) | 7-Diethyl amino-4-methyl coumarin anthracene |
| Argon ion (488 nm) | Alexandrite |
| Argon ion (514.5 nm) | Cresyl violet perchlorate |
| Doubled YAG (532 nm) | 5,5'-Dichloro-11-diphenylamino-3,3'-diethyl-10,12-ethylenethiatri-carbocyanine perchlorate (IR-140) |

Alexandrite (750 nm-tunable) HITC

Additional optical limiter materials for alexandrite can be selected from cyanine laser dyes that lase at wavelengths ≳750 nm (see Schäfer, op. cit.)

A large number of aromatic molecules having $\sigma_2 > \sigma_1$, are listed in J. B. Birks, *Photophysics of Aromatic Molecules,* Wiley-Interscience, NY, 1970. Data on four of the other five criteria appear in I. B. Berlman, *Handbook of Fluoroescence Spectra of Aromatic Molecules,* 2nd ed., Academic Press, NY, 1971. The remaining criterion, rapid decay primarily to the excited state from a second excited state, is met, in general, by the materials that meet the other five criteria. Furthermore, whether this decay is faster than decay from the excited state can be inferred from fluorescence spectra that appear in Berlman.

The optical limiter may be placed in the laser beam path, either inside the laser cavity or outside. Ideally, a perfect OPL would be placed outside the cavity, where it would not interfere with lasing. In practice, however, excited state absorption may not be much greater than ground state absorption. In that case, intra-cavity placement is preferred, because the beam then makes many passes through the limiter, and the effect of induced absorption is thereby multiplied. Another advantage of intra-cavity placement is that $I_{sat}$ is generally easier to achieve inside the cavity. In addition, an inta-cavity OPL tends to damp out oscillations and thereby stabilize the laser output. However, the ground state absorption of an intra-cavity OPL should not be too large, because the beam intensity is reduced during each pass. When the OPL is a solution, a solvent is selected that does not interfere with the operation of the OPL and the solution is contained in a cell of material that is substantially transparent to the laser beam. Suitable solvents and cell materials are well known and are disclosed in patents and publications that relate to dye lasers and to saturable absorbers.

Figure 3:
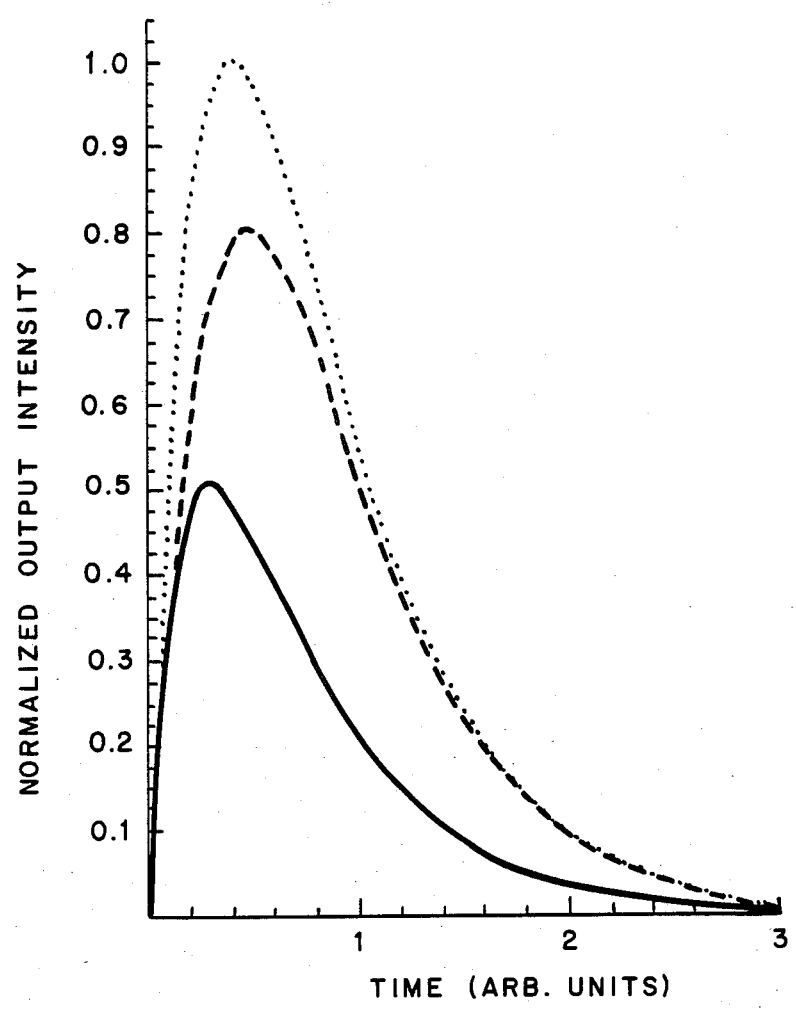
FIG. 3 depicts the effect of an energy limiter on a typical pulse.

Besides providing an OPL for cw laser operation, the present invention provides an EL/PS for pulsed- or Q-switched-laser operation. The initial part of the pulse passes through the EL/PS attenuated by (low) ground state absorption, while the later part is subject to the strong excited state absorption. As a result, the trailing edge is compressed and the pulse thereby shortened. This effect is shown in FIG. 3, which depicts, as a dotted curve, a typical pulse that may be incident on an EL/PS. If a saturable absorber, with no excited state absorption, is placed in the beam, the dashed curve results. If, instead, an EL/PS is placed in the beam, the sharpened pulse shown in the solid curve results.

The criteria for preferred materials for an EL/PS are the same as for an OPL, with one exception. As discussed above, an OPL should have a decay time from the excited state to the ground state that is short compared with the time scale of the fluctuations being controlled. In operation as an EL/PS, the laser pulse is preferably short compared with the lifetime of the excited state. Laser dyes and saturable absorbers, having excited state lifetimes typically of the order of a few nanoseconds, are well-suited (when the other criteria are met) for EL/PS materials, since the pulses whose durations are to be shortened are generally in the picosecond range.

When the pulse duration is short compared with the lifetime of the excited state, the saturation energy is given by $$E_{sat} = I_{sat}\tau_p = \frac{hc\,\pi r^2}{\lambda\,\sigma_1}$$

where $\tau_p$ is the pulse duration. For alexandrite, if $\lambda$ equals 488 nm and r equals 10 $\mu$m, $E_{sat} \approx 100\ \mu$J.

The EL/PS is most effective when the desired transmitted pulse energy is about equal to $E_{sat}$. The incident pulse energy must, of course, be greater than $E_{sat}$. However, if incident energy is much greater than $E_{sat}$, the absorbed energy is wasted and causes undesirable heating. Alternatively, an optical limiter can protect sensitive optics (including, e.g., detectors) by being placed between the optics and a radiation source. In that case, of course, the heating is not undesirable, but instead is the alternative to damaging the optics.

We claim:

1. An apparatus comprising a laser for producing a beam having a certain wavelength and, in the laser beam path, an optical limiter comprising a material that has a ground state, a first excited state, and a second excited state of higher energy than the first excited state, and has, at said certain wavelength,
    (a) a cross section for excitation from the first excited state that is greater than the cross section for excitation from the ground state to the first excited state;
    (b) substantially no decay from the first excited state to states that have decay times longer than the time for decay from the first excited state to the ground state; and
    (c) rapid decay from the second excited state to the first excited state,
whereby an optical limiter absorption coefficient at said certain wavelength increases with increasing intensity.

2. The limiter of claim 1 in which the laser material is selected from a group that consists of alexandrite, ruby, and MgO:Cr$^{3+}$.

3. The laser of claim 2 in which the limiter material is alexandrite.

4. The laser of claim 1 in which the limiter material is a suitably contained laser dye or saturable absorber dye.

5. The laser of claim 1 in which the laser includes a cavity and the optical limiter is within the laser cavity.

6. A process for stabilizing the power in a laser beam that has a certain wavelength comprises placing in the path of the laser beam a material that has a ground state, a first excited state, and a second excited state of higher energy than the first excited state, and has, at said certain wavelength of the laser beam,
   (a) a cross section for excitation from the first excited state that is greater than the cross section for excitation from the ground state to the first excited state;
   (b) substantially no decay from the first excited state to states that have decay times longer than the time for decay from the first excited state to the ground state, and
   (c) rapid decay from the second excited state to the first excited state whereby an absorption coefficient of the material at said certain wavelength increases with increasing intensity.

7. The process of claim 6 in which the material is a Cr-doped crystalline solid.

8. The process of claim 6 in which the material is a suitably contained laser dye or saturable absorber dye.

9. The process of claim 6 in which the material is placed within the laser cavity.

10. The process of claim 6 in which the laser beam is provided by a cw laser and the average intensity of the beam incident on the material is of the order of $I_{sat}$, where $$I_{sat} = \frac{hc\,\pi r^2}{\lambda\,\sigma_1\,\tau_f},$$

where h is Planck's content, c the speed of light, $\lambda$ the wavelength of the laser beam, r the beam radius, $\sigma_1$ the ground state absorption cross section, and $\tau_f$ the lifetime of the first excited state.

11. A process for limiting the energy in a laser pulse that comprises placing in the path of the pulse, at a point where the incident energy during the pulse interval is at least about a predetermined energy, a material that has a ground state, a first excited state, and a second excited state of higher energy than the first excited state, and has, at a certain wavelength of the pulse,
   (a) a cross section for excitation from the first excited state that is greater than the cross section for excitation from the ground state to the first excited state;
   (b) substantially no decay from the first excited state to states that have decay times longer than the time for decay from the first excited state to the ground state, and
   (c) rapid decay from the second excited state to the first excited state whereby an absorption coefficient of the material at said certain wavelength increases with increasing intensity.

12. The process of claim 11 in which the material is chosen so that the predetermined energy E is approximately related to the parameters of the material by $$E = \frac{hc\,\pi r^2}{\lambda\,\sigma_1},$$

where h is Planck's constant, c the speed of light, $\lambda$ the wavelength of the pulse, r the pulse beam radius, and $\sigma_1$ the ground state absorption cross section of the material.

13. The process of claim 11 in which the material is a Cr-doped crystalline solid.

14. The process of claim 11 in which the material is a suitably contained laser dye or saturable absorber dye.

* * * * *